(12) United States Patent
Lee

(10) Patent No.: US 12,549,064 B2
(45) Date of Patent: Feb. 10, 2026

(54) TRANSMISSION AND ELECTRIC DRIVE DEVICE INCLUDING THE SAME

(71) Applicant: HL MANDO CORPORATION, Gyeonggi-do (KR)

(72) Inventor: Kyungtack Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 251 days.

(21) Appl. No.: 18/241,233

(22) Filed: Aug. 31, 2023

(65) Prior Publication Data

US 2024/0305166 A1    Sep. 12, 2024

(30) Foreign Application Priority Data

Mar. 7, 2023   (KR) .................. 10-2023-0029654

(51) Int. Cl.
*H02K 7/116*   (2006.01)
*F16H 37/08*   (2006.01)
*F16H 63/34*   (2006.01)

(52) U.S. Cl.
CPC ............. *H02K 7/116* (2013.01); *F16H 37/08* (2013.01); *F16H 63/3441* (2013.01)

(58) Field of Classification Search
CPC ...... H02K 7/116; F16H 37/08; F16H 63/3441
USPC ............................................ 310/83, 98, 99
See application file for complete search history.

(56) References Cited

U.S. PATENT DOCUMENTS

2025/0164001 A1*   5/2025   Butta .................. F16H 57/0476

FOREIGN PATENT DOCUMENTS

| CN | 214661897 U | * 11/2021 |
|---|---|---|
| JP | 5-27395 | 4/1993 |
| JP | 2020-70848 | 5/2020 |
| KR | 10-0428298 | 4/2004 |
| KR | 10-2020-0089950 | 7/2020 |
| KR | 10-2022-0061125 | 5/2022 |

OTHER PUBLICATIONS

Office Action dated Sep. 5, 2024 for Korean Patent Application No. 10-2023-0029654 and its English translation from Global Dossier.

* cited by examiner

*Primary Examiner* — Jose A Gonzalez Quinones
(74) *Attorney, Agent, or Firm* — WOMBLE BOND DICKINSON (US) LLP

(57) ABSTRACT

A transmission, which is accommodated in a housing in which a space is formed and includes a first gear rotated by a driving force provided by an electric motor, a rotary shaft to which the first gear is coupled, a second gear formed on an outer circumferential surface of the rotary shaft and having a diameter smaller than a diameter of the first gear, and a third gear engaged with the second gear and having a diameter greater than the diameter of the second gear, wherein the rotary shaft includes a support configured to support an axial load of the third gear, can be provided.

10 Claims, 10 Drawing Sheets

TRANSMISSION AND ELECTRIC DRIVE DEVICE INCLUDING THE SAME

CROSS-REFERENCE TO RELATED APPLICATION

This application claims the benefit of Korean Patent Application No. 10-2023-0029654, filed on Mar. 7, 2023 in the Korean Intellectual Property Office, the disclosure of which is incorporated herein by reference.

BACKGROUND

1. Field

Embodiments of the present disclosure relate to an electric drive device including a gearbox configured to change a driving force of an electric motor.

2. Description of the Related Art

In general, internal combustion engines such as gasoline engines and diesel engines, which are used as prime movers for vehicles, use heat energy generated when fossil fuel is burned in cylinders as power. Recently, as global environmental issues have become a global concern, environmental regulations are being tightened mainly in developed countries, and especially, exhaust gas regulations and fuel efficiency regulations related to vehicles are further expanding.

According to the development trend of vehicles, many studies on vehicles with low pollution have been carried out instead of current vehicles which use gasoline heavy oil as a main fuel and seriously affect air pollution, and in such studies, attention on electric vehicles which produce less noise and no exhaust gas have recently been a focus.

In the electric vehicle, a storage battery, which is a secondary battery, is used as a driving power source, and instead of the conventional gasoline or diesel engine, a driving motor is driven by a high voltage and a high current output from the storage battery, and power generated by the driving motor is transmitted to a driving wheel through a power transmission system to rotate the driving wheel.

In the electric vehicle operating as described above, although any explosion sound like that in the internal combustion engine is not generated and any pollution such as air pollution is not generated, since energy stored in a capacitor is limited and the operating principle of the electric vehicle is different from that of the internal combustion engine, a structure should be changed by changing, adding, and removing a transmission installed in the vehicle, a separate power transmission means, or the like.

Since the driving motor, which is a power source of the electric vehicle, is driven to be rotated using electrical energy of the capacitor, a rotational force and a rotation speed of the driving motor can be directly controlled by a vehicle controller to change a vehicle speed. That is, unlike the internal combustion engine vehicle, in the electric vehicle, since the driving motor is easy to control, the vehicle speed can be smoothly changed by controlling the driving motor even without a separate transmission.

However, when the vehicle speed is changed by controlling the driving motor, there are problems that the power consumption increases due to a large load applied to the driving motor, and thus, a travel distance per charge decreases, and a configuration of the controller for controlling the driving motor and the driving motor is complicated. Accordingly, a transmission suitable for a driving motor is required for an electric vehicle in terms of energy efficiency, but research and development on the transmission for the electric vehicle are still insufficient.

At present, transmissions for electric vehicles have not much been developed, and conventional manual transmissions or automatic transmissions with 4 or more gear ratios for internal combustion engines have been used without changing. In this case, a synchronized manual transmission, which forcibly matches circumferential speeds of gears engaged with each other in a transmission for an electric vehicle so that teeth are easily engaged with each other, is generally used.

RELATED ART

Patent Document

Korean Patent No. 10-0428298 (Registered on Apr. 9, 2004)

SUMMARY

Therefore, it is an aspect of the disclosure to provide a transmission provided with a structure capable of supporting an axial load of an output gear.

It is another aspect of the disclosure to provide an electric drive device in which a roller bearing is used to support rotation of an output gear.

In accordance with one aspect of the present disclosure, a transmission accommodated in a housing in which a space is formed includes a first gear rotated by a driving force provided by an electric motor, a rotary shaft to which the first gear is coupled, a second gear formed on an outer circumferential surface of the rotary shaft and having a diameter smaller than a diameter of the first gear, and a third gear engaged with the second gear and having a diameter greater than the diameter of the second gear, wherein the rotary shaft includes a support configured to support an axial load of the third gear.

Bearings may be interposed between the housing and both end portions of the rotary shaft.

The support may have a ring shape protruding outward in a radial direction of the rotary shaft.

The support may be provided as two supports in ring shapes to support both side portions of the third gear.

The transmission may include a bearing support frame installed in the housing.

The third gear may be coupled to a differential case.

A bearing may be interposed between the differential case and the bearing support frame, the bearing support frame may serve as an outer wheel of the bearing, and the third gear may serve as an inner wheel.

The bearing may be a roller bearing.

Each of the first to third gears may include a helical gear.

In accordance with another aspect of the present disclosure, an electric drive device includes a housing in which a space is formed, an electric motor disposed at one side of the housing, a transmission configured to reduce a driving force generated by the electric motor, and a differential assembly to which output power of the transmission is transmitted, wherein the transmission includes a first gear, a second gear, and a third gear formed of helical gears sequentially engaged with each other, and supports each configured to support an axial load of the third gear are formed on both sides of the second gear.

The housing may include a motor housing part configured to accommodate the electric motor and a transmission housing part coupled to the motor housing part and configured to accommodate the transmission.

The transmission may further include a rotary shaft rotatably installed in the transmission housing part, the second gear may be formed on an outer circumferential surface of the rotary shaft, and the supports may be formed on the both sides of the second gear on the rotary shaft.

The transmission may further include a ball bearing interposed between the transmission housing part and the rotary shaft.

The transmission may further include a bearing support frame coupled to the motor housing part and disposed in the transmission housing part to support rotation of the third gear.

The differential assembly may include a differential gear set and a differential case configured to accommodate the differential gear set, and the third gear may be coupled to the differential case.

The transmission may further include a bearing interposed between the bearing support frame and one side of the differential case, and the bearing may be a roller bearing.

The transmission may further include a bearing interposed between the transmission housing part and the other side of the differential case, and the bearing may be a roller bearing.

The electric drive device may further include a parking unit configured to restrict rotation of the support, wherein the parking unit may include an actuator, a transmitter configured to transmit power provided from the actuator, and a parking shaft vertically moved by the transmitter so that a part of the parking shaft is inserted into the support.

The actuator and the transmitter may be disposed outside the housing, and a hole through which the parking shaft passes may be formed in the housing.

A parking groove configured to accommodate the parking shaft may be formed in the support.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
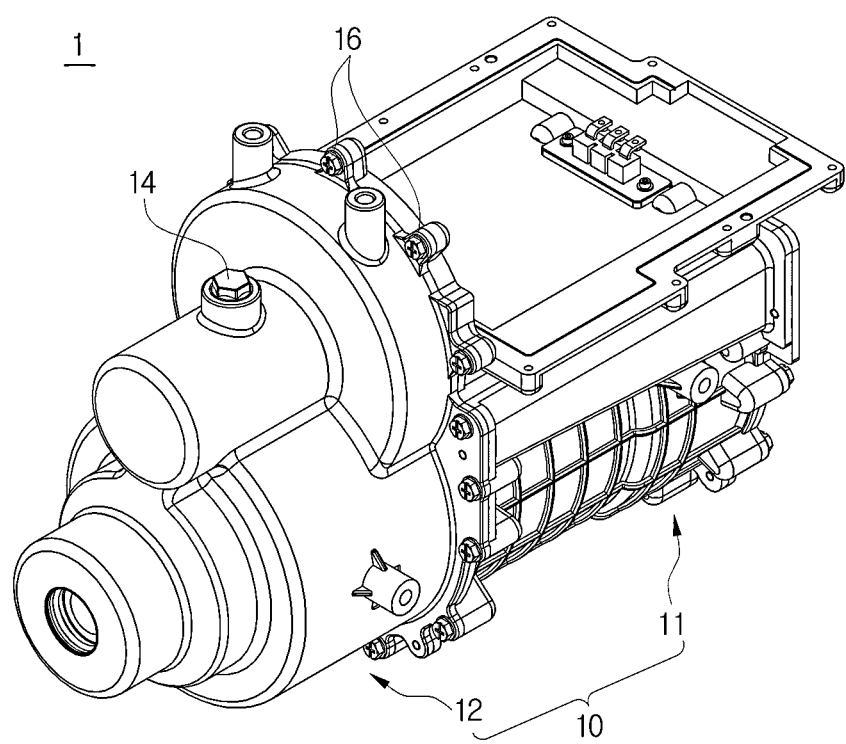
FIG. 1 is a perspective view illustrating an electric drive device according to one embodiment of the present invention.

Hereinafter, embodiments of the present disclosure will be described in detail with reference to the accompanying drawings. The embodiments, which will be described below, are examples which provide the concept of the present disclosure to those skilled in the art. The present disclosure is not limited to the embodiments, and may be implemented in different forms. Parts irrelevant to the description are omitted in the drawings in order to clearly describe the present disclosure, and widths, lengths, and thicknesses of components in the drawings may be exaggerated for convenience of description. In this specification, like reference characters denote like components.

Figure 2:
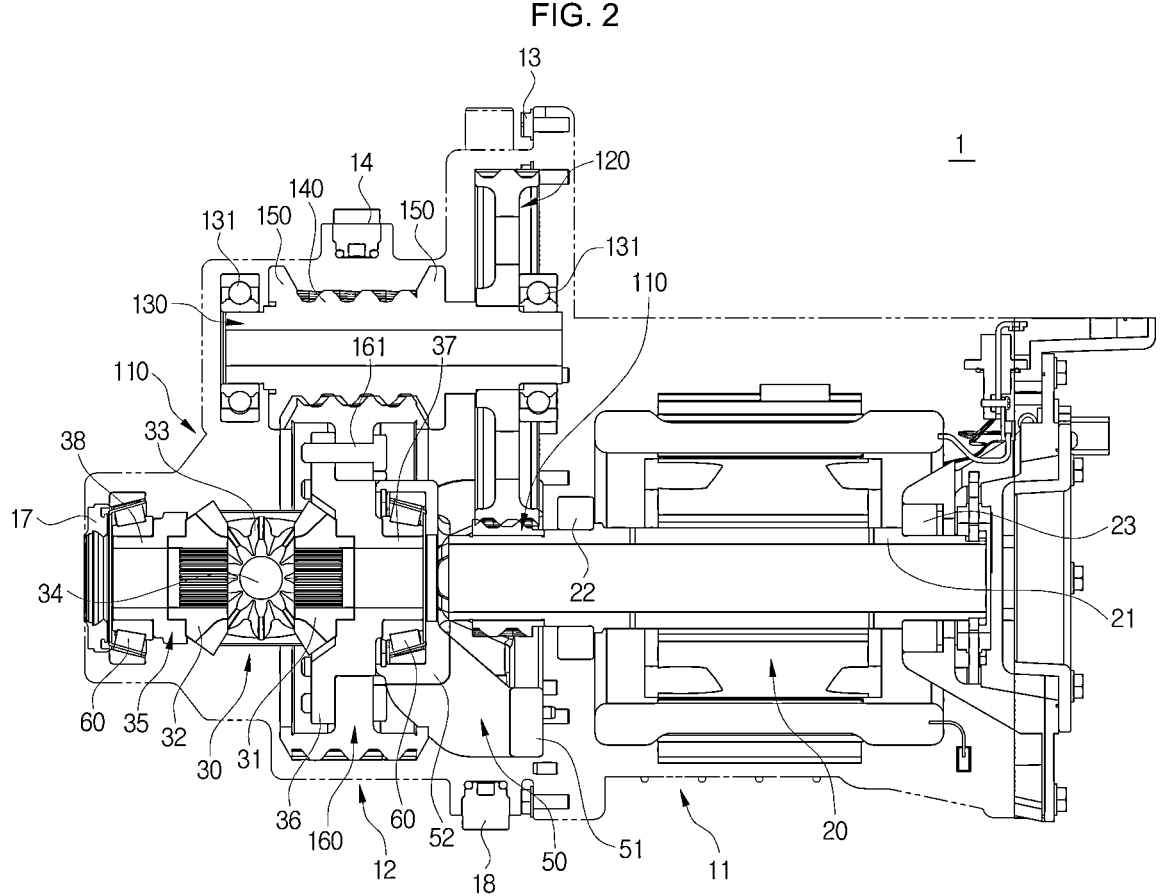
FIG. 2 is a cross-sectional view illustrating the electric drive device illustrated in FIG. 1.
Figure 3:
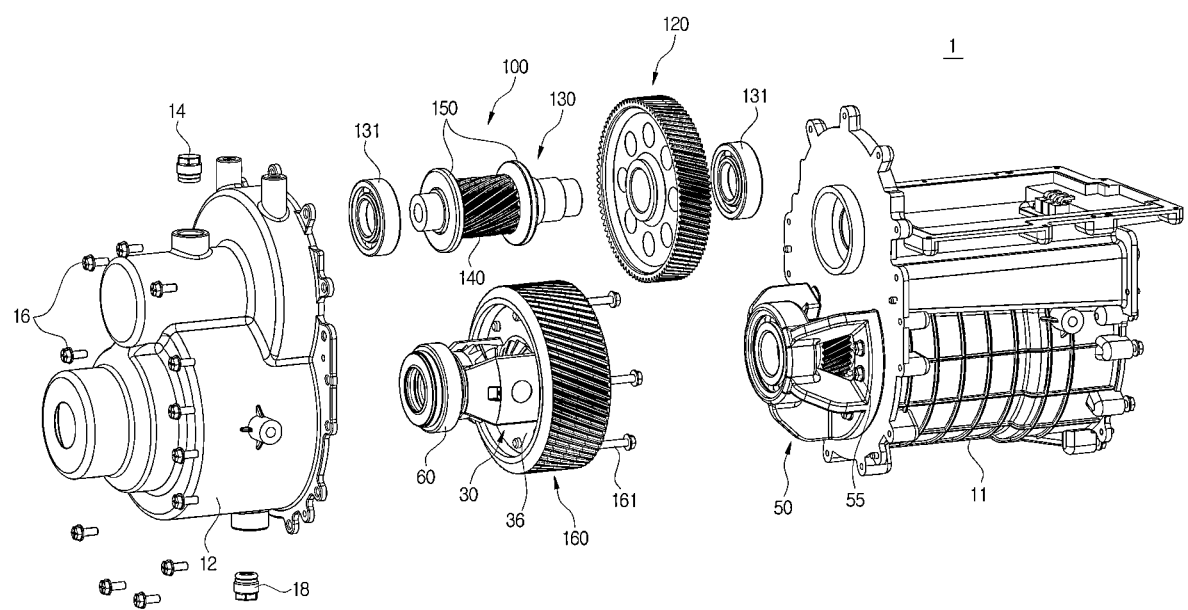
FIG. 3 is an exploded perspective view for describing a transmission of the electric drive device illustrated in FIG. 1.
Figure 4:
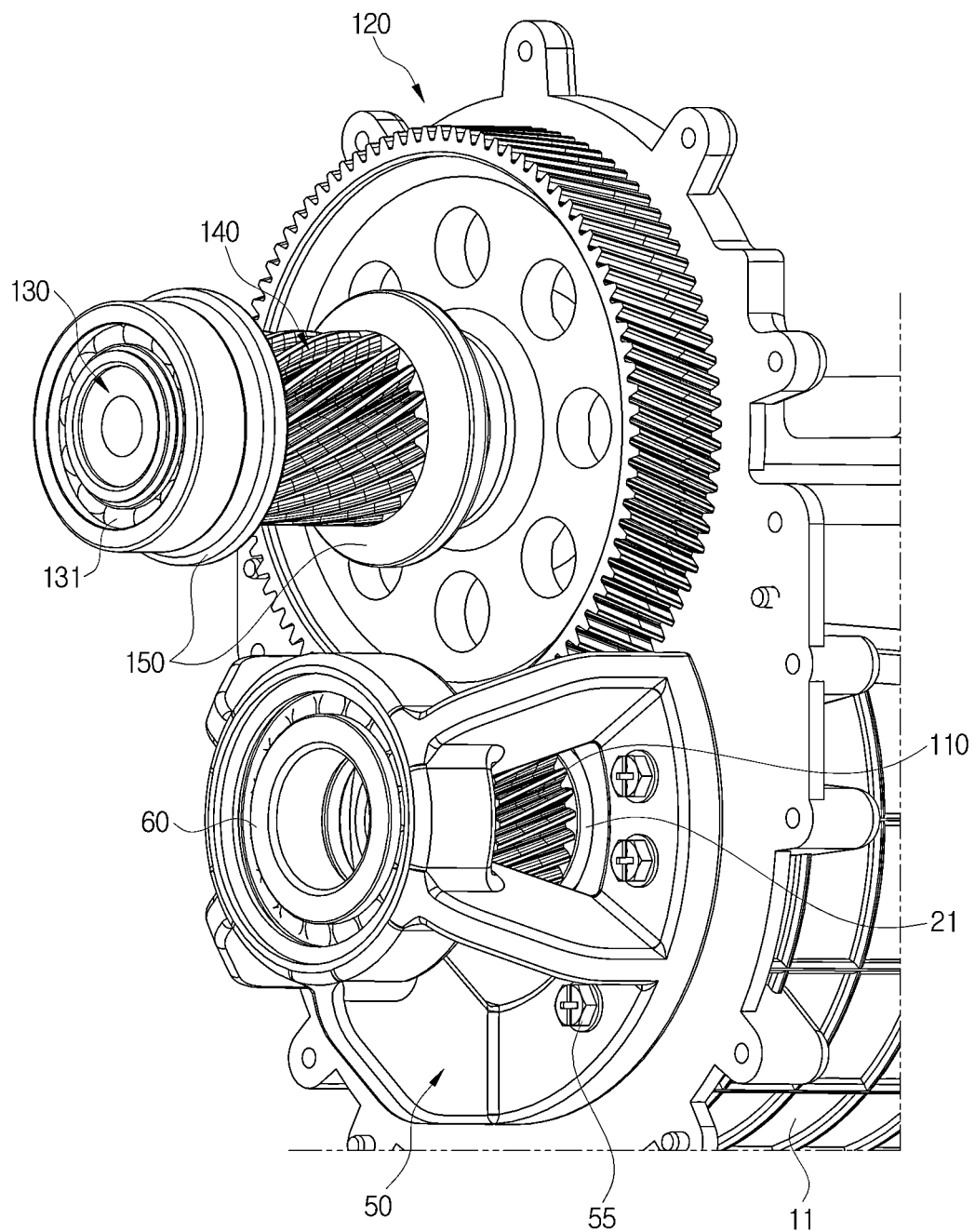
FIG. 4 is an enlarged perspective view illustrating portion A of the electric drive device illustrated in FIG. 3.

FIG. 1 is a perspective view illustrating an electric drive device 1 according to one embodiment of the present invention. FIG. 2 is a cross-sectional view illustrating the electric drive device 1 illustrated in FIG. 1. FIG. 3 is an exploded perspective view for describing a transmission 100 of the electric drive device illustrated in FIG. 1. FIG. 4 is an enlarged perspective view illustrating portion A of the electric drive device 1 illustrated in FIG. 3.

The electric drive device 1 corresponds to an E-Drive system in which a motor, an inverter, and a gearbox are provided as a set. The electric drive device 1 may include a housing 10 which forms a space therein, the transmission 100 accommodated in the housing, a differential assembly 30 to which output power of the transmission 100 is transmitted, and an electric motor 20 disposed at one side of the housing 10. The transmission 100 may be configured to reduce a driving force generated by the electric motor 20.

The housing 10 may include a motor housing part 11 which accommodates the electric motor 20 and a transmission housing part 12 which is coupled to the motor housing part 11 and accommodates the transmission 100. The transmission housing part 12 may be coupled to the motor housing part 11 using a bolt 16.

An injection plug 14 for injecting oil may be provided on an upper side of the transmission housing part 12, and a drain plug 18 for discharging the oil may be provided on a lower side of the transmission housing part 12. An oil seal 17 may be provided on an outer side of the transmission housing part 12.

Referring to FIGS. 2 and 3, the transmission 100 may include a first gear 120, a second gear 140, and a third gear 160 which are helical gears engaged with each other. Supports 150 which support an axial load of the third gear 160 may be formed at both sides of the second gear 140.

The first gear 120 may be rotated by a driving force provided by the electric motor 20. An input gear 110 may be coupled to a driving shaft 21 of the electric motor 20. Bearings 22 and 23 for supporting rotation of the driving shaft 21 may be provided on the electric motor 20.

The first gear 120 may be engaged with the input gear 110. The first gear 120 may be press-fitted and coupled to an outer circumferential surface of the rotary shaft 130. The second gear 140 may be formed on the outer circumferential surface of the rotary shaft 130. The third gear 160 may be engaged with the second gear 140.

A diameter of the first gear 120 may be greater than a diameter of the input gear 110. A diameter of the second gear 140 may be smaller than the diameter of the first gear 120. A diameter of the third gear 160 may be greater than the diameter of the second gear 140. Accordingly, a driving force transmitted from the input gear 110 may be reduced through the first to third gears 120, 140, and 160. The supports 150 may be formed on the outer circumferential surface of rotary shaft 130 at both sides of the second gear 140 in an axial direction.

Bearings 131 may be interposed between the transmission housing part 12 of the housing 10 and both end portions of the rotary shaft 130. Ball bearings may be used as the bearings 131. The bearings 131 may be disposed just beside the motor housing part 11, and the first gear 120 may be disposed just beside the bearings 131.

The differential assembly 30 may include two planetary gears 33 disposed to face each other, two side gears 34 disposed to face each other, and a differential case 31. The planetary gears 33 and the side gears 34 form a differential gear set. The two side gears 34 may be press-fitted into the differential case 31.

Referring to FIG. 3, the differential case 31 may include a flange 36 integrally formed with the differential case 31. The third gear 160 may be coupled to the flange 36 using a bolt 161. Accordingly, when the third gear 160 rotates, the differential case 31 may rotate with the third gear 160.

Referring to FIGS. 3 and 4, a bearing support frame 50 may be provided to support rotation of the third gear 160. The input gear 110 may be disposed in an inner space of the bearing support frame 50, and the bearing support frame 50 may have a shape of which an upper portion is open so that the input gear 110 and the first gear 120 are engaged with each other.

One end portion 51 of the bearing support frame 50 may be coupled to the motor housing part 11 using a bolt 55 and disposed in the transmission housing part 12. A bearing 60 may be disposed on the other end portion 52 of the bearing support frame 50.

The bearing 60 may be interposed between an inner circumferential surface of an end portion of the bearing support frame 50 and an outer circumferential surface of a rotating support 37 formed on one end portion of the differential case 31. A roller bearing may be provided as the bearing 60. In this case, the bearing support frame 50 may serve as an outer wheel of the bearing 60, and the differential case 31 may serve as an inner wheel.

A bearing 60 may be interposed between an inner surface of an outer portion of the transmission housing part 12 and an outer circumferential surface of a rotating support 38 formed on the other end portion of the differential case 31. A roller bearing may be provided as the bearing 60. In this case, the transmission housing part 12 may serve as an outer wheel of the bearing 60, and the differential case 31 may serve as an inner wheel.

Figure 5:
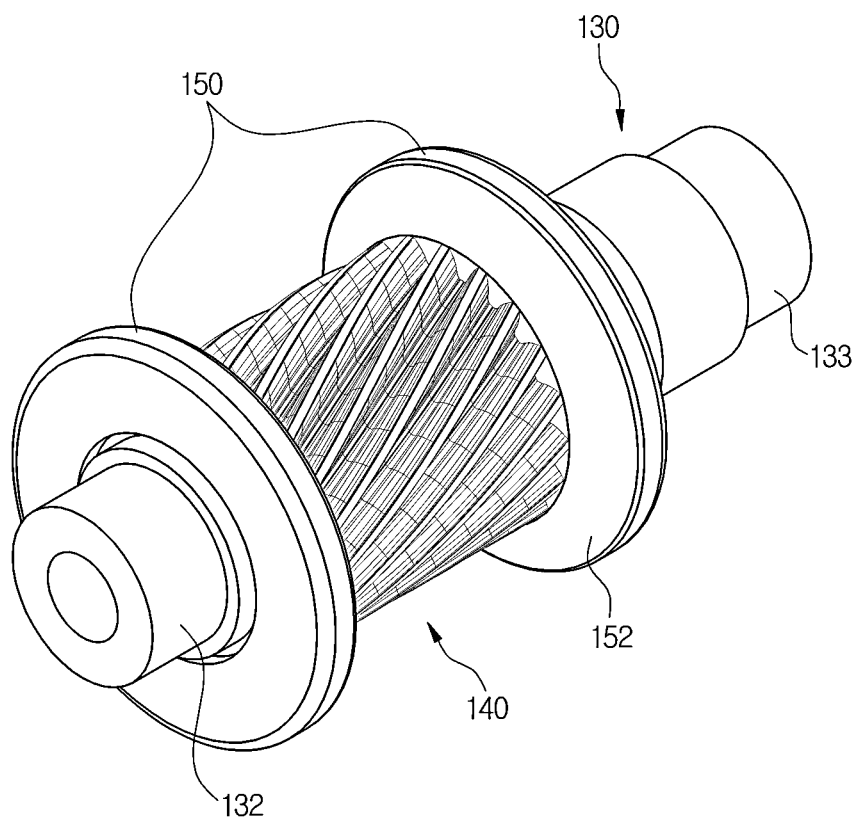
FIG. 5 is a perspective view illustrating a rotary shaft illustrated in FIG. 3.
Figure 6:
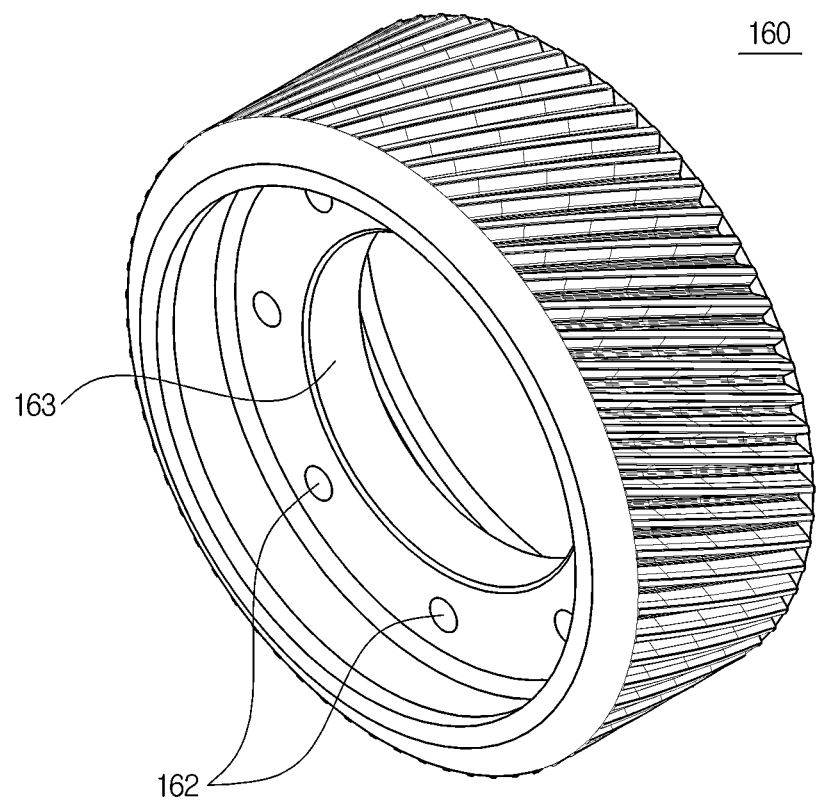
FIG. 6 is a perspective view illustrating a third gear illustrated in FIG. 3.
Figure 7:
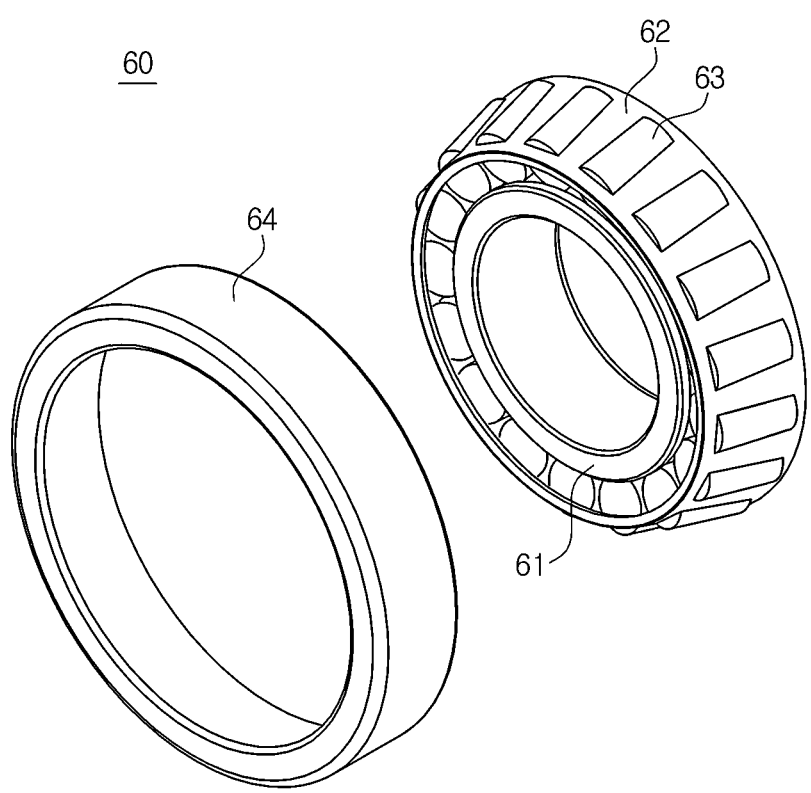
FIG. 7 is an exploded perspective view illustrating a bearing illustrated in FIG. 3.

FIG. 5 is a perspective view illustrating the rotary shaft 130 illustrated in FIG. 3. FIG. 6 is a perspective view illustrating the third gear 160 illustrated in FIG. 3. FIG. 7 is an exploded perspective view illustrating the bearing 60 illustrated in FIG. 3.

Referring to FIG. 5, the second gear 140 and the supports 150 may be formed on the outer circumferential surface of the rotary shaft 130. The supports 150 may be formed on both sides of the second gear 140. Each of the supports 150 may have a ring shape protruding outward in a radius direction of the rotary shaft 130. The ring shape may be provided as two ring shapes at both sides of the second gear 140.

As an example, an inclined surface may be provided as an inner surface 152 of the support 150, and in this case, the support 150 may have a substantially conical shape. That is, the support 150 may have a thrust collar shape.

A bearing 131 may be disposed on one end portion 132 of the rotary shaft 130, and a bearing 131 may also be disposed on the other end portion 13. In order to use the same bearing 131, one end portion 132 and the other end portion 13 may have the same diameter.

Referring to FIG. 6, the third gear 160 may have through holes 162 to be coupled to a flange 46. The differential case 31 may be fitted to an inner surface 163 of the third gear 160. The third gear 160 may serve as an output gear of the transmission 100.

Referring to FIG. 7, the roller bearing 60 may include an inner rotating body 61, a retainer 62, rollers 63, and an outer rotating body 64. Each of the rollers 63 may have a cylindrical shape having a constant diameter.

According to one embodiment, since the support is provided, an axial load can be supported without a problem like that of the conventional structure. In addition, since a size of a bearing support structure of an output gear end (that is, a third gear side) may be reduced, a size of a package of the E-drive system can be reduced. In addition, since a manufacturing cost of applying a general roller bearing and a thrust color structure is generally smaller than that of applying a thrust bearing, costs can be reduced.

Figure 8:
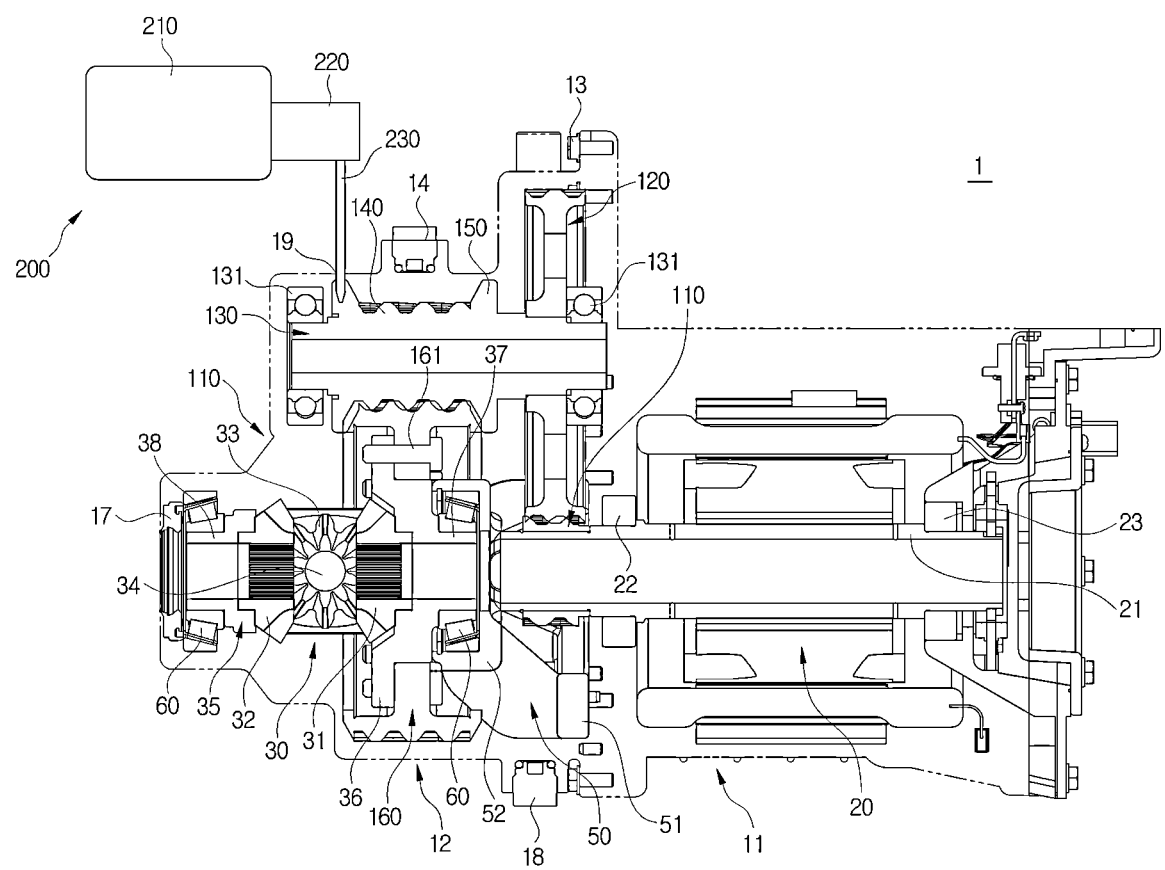
FIG. 8 is a cross-sectional view illustrating a parking unit installed in the electric drive device illustrated in FIG. 2.
Figure 9:
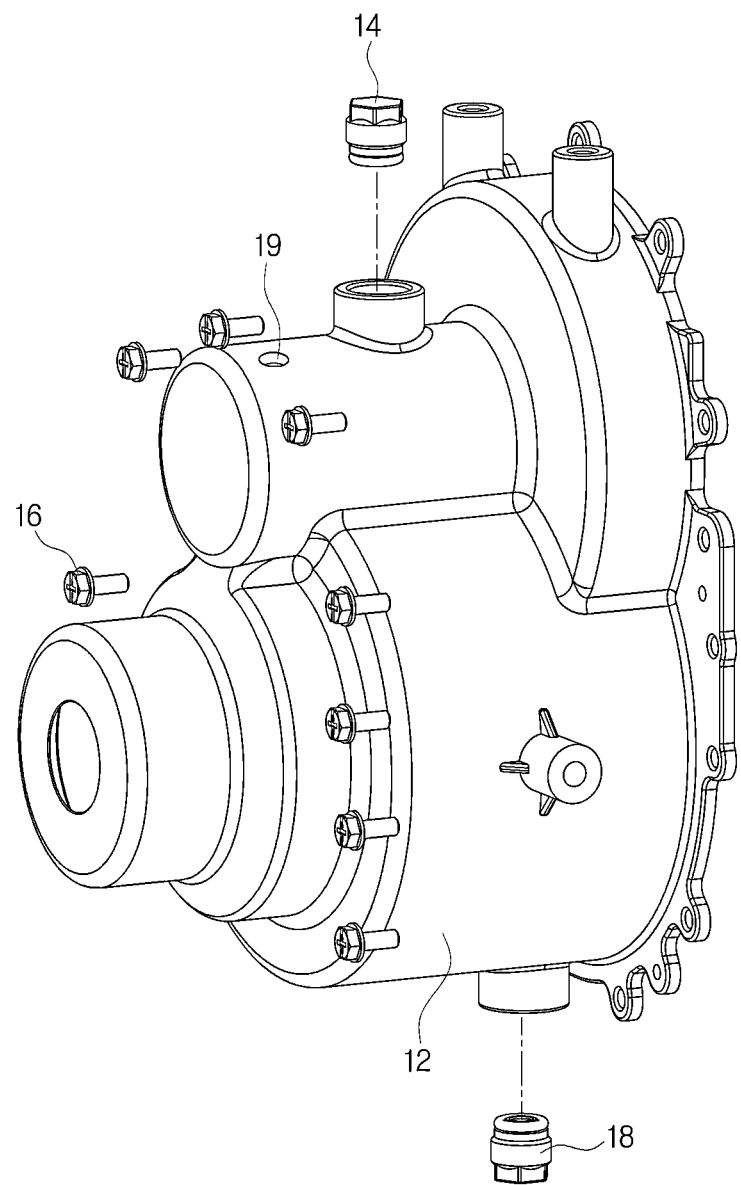
FIG. 9 is a perspective view illustrating a hole formed in the transmission housing part illustrated in FIG. 3.
Figure 10:
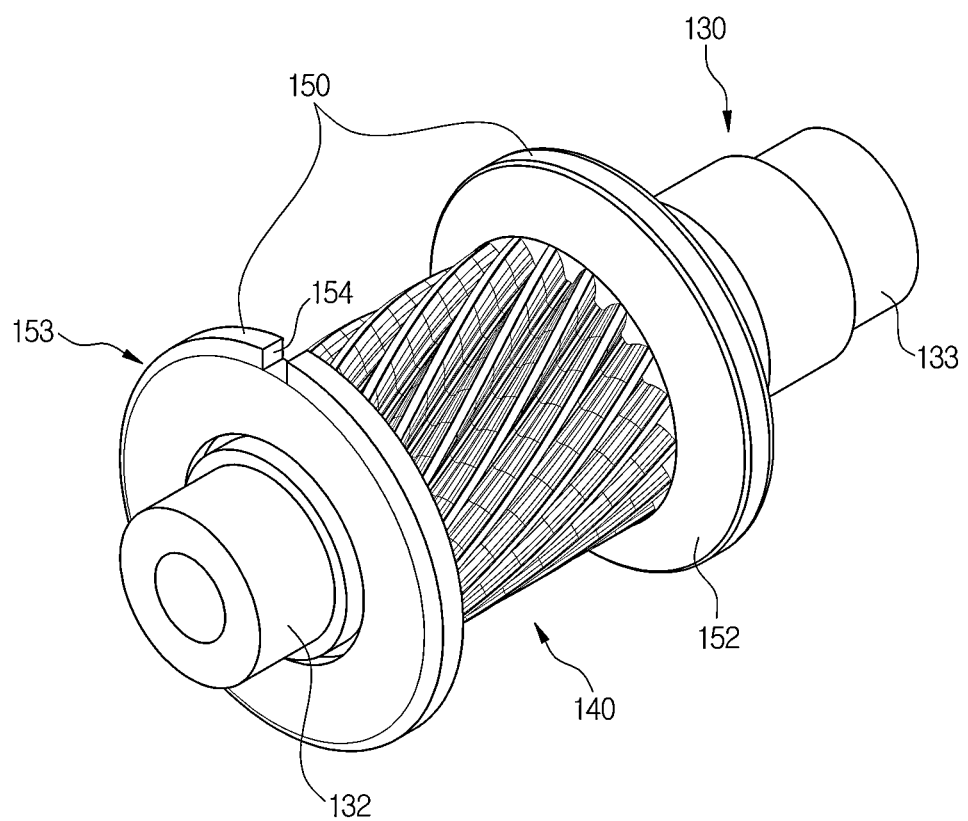
FIG. 10 is a perspective view illustrating a parking groove formed in the rotary shaft illustrated in FIG. 5.

FIG. 8 is a cross-sectional view illustrating a parking unit 200 installed in the electric drive device 1 illustrated in FIG. 2. FIG. 9 is a perspective view illustrating a hole 19 formed in the transmission housing part 12 illustrated in FIG. 3. FIG. 10 is a perspective view illustrating a parking groove 154 formed in the rotary shaft 130 illustrated in FIG. 5.

The electric drive device 1 may further include the parking unit 200 configured to restrict rotation of the support 150. An E-Drive Gear structure of a thrust collar type may be partially changed and installed as the parking unit 200. Accordingly, when a parking function is required according to a request of a vehicle manufacturer, the parking unit 200 may be installed without an additional structure. As described above, since a structural change of an E-Drive Gear for installing the parking unit 200 is not required, the parking function can be added without an additional cost, and design man-hours for reducing a manufacturing cost and changing a structure can be reduced.

The parking unit 200 includes an actuator 210, a transmitter 220 which transmits power provided by the actuator 210, and a parking shaft 230 vertically moved by the transmitter 220 so that a part of the parking shaft 230 is inserted into the support 150. In this case, not only the parking shaft 230 may be moved in a vertical direction and inserted in a direction (radial direction) perpendicular to the rotary shaft 130, but the parking shaft 230 may also be moved in a left-right direction and inserted in a direction (axial direction) parallel to the rotary shaft 130. An electric motor, a hydraulic unit, or the like may be used as the actuator 210. A shift gear set or the like may be used as the transmitter 220.

The actuator 210 and the transmitter 220 may be disposed outside the housing 10. A hole 19 through which the parking shaft 230 passes may be formed in the transmission housing part 12 of the housing 10.

In the supports 150, a parking groove 154 for accommodating the parking shaft 230 may be formed in the support 150 positioned at a side away from the electric motor 20. Accordingly, when a lower end portion of the parking shaft 230 is inserted into the parking groove 154, the rotary shaft 130 cannot rotate.

According to the embodiment, a slot shape for a parking function may be added to the support 150, that is, a thrust collar, of the rotary shaft 130. The rotary shaft 130 may have a structure of a parking pin configured to move in a circumferential direction with respect to the support 150.

According to a transmission according to one embodiment of the present invention, since supports are provided on both sides of a second gear, an axial load of a third gear used as an output gear can be supported.

According to an electric drive device according to one embodiment of the present invention, since a roller bearing is used as a bearing configured to support rotation of a third gear used as an output gear, a packaging size can be reduced, and thus costs can be reduced.

While the present invention has been described above with reference to embodiments illustrated in the accompanying drawings, this is merely exemplary. It will be understood by those skilled in the art that various modifications and other equivalent example embodiments may be made from the embodiments of the present invention. Therefore, the scope of the present invention is defined by the appended claims.

What is claimed is:

1. An electric drive device comprising:
   a housing in which a space is formed;
   an electric motor disposed at one side of the housing;
   a transmission configured to reduce a driving force generated by the electric motor; and
   a differential assembly to which output power of the transmission is transmitted,
   wherein the transmission includes a first gear, a second gear, and a third gear formed of helical gears sequentially engaged with each other, and
   supports each configured to support an axial load of the third gear are formed on both sides of the second gear, and
   the electric drive device further comprising a parking unit configured to restrict rotation of the support,
   wherein the parking unit includes:
   an actuator;
   a transmitter configured to transmit power provided from the actuator; and
   a parking shaft moved by the transmitter so that a part of the parking shaft is inserted into the support.

2. The electric drive device of claim 1, wherein the housing includes:
   a motor housing part configured to accommodate the electric motor; and
   a transmission housing part coupled to the motor housing part and configured to accommodate the transmission.

3. The electric drive device of claim 2, wherein:
   the transmission further includes a rotary shaft rotatably installed in the transmission housing part;
   the second gear is formed on an outer circumferential surface of the rotary shaft; and
   the supports are formed on both sides of the second gear on the rotary shaft.

4. The electric drive device of claim 3, wherein the transmission further includes a ball bearing interposed between the transmission housing part and the rotary shaft.

5. The electric drive device of claim 2, wherein the transmission further includes a bearing support frame coupled to the motor housing part and disposed in the transmission housing part to support rotation of the third gear.

6. The electric drive device of claim 5, wherein:
   the differential assembly includes a differential gear set and a differential case configured to accommodate the differential gear set; and
   the third gear is coupled to the differential case.

7. The electric drive device of claim 6, wherein:
   the transmission further includes a bearing interposed between the bearing support frame and one side of the differential case; and
   the bearing includes a roller bearing.

8. The electric drive device of claim 7, wherein:
   the transmission further includes a bearing interposed between the transmission housing part and the other side of the differential case; and
   the bearing includes a roller bearing.

9. The electric drive device of claim 1, wherein:
   the actuator and the transmitter are disposed outside the housing; and
   a hole through which the parking shaft passes is formed in the housing.

10. The electric drive device of claim 1, wherein a parking groove configured to accommodate the parking shaft is formed in the support.

* * * * *